Patented July 17, 1951

2,560,642

UNITED STATES PATENT OFFICE 2,560,642

TREATMENT OF PITCHES OR TARS AND THE MANUFACTURE OF MOLDED ARTICLES THEREFROM

Charles Desmond Greaves, London, and Derek Bryce Smith, Woodford Green, England, assignors to C. D. Patents Limited, London, England, a British company No Drawing. Application September 16, 1947, Serial No. 774,410. In Great Britain June 19, 1946

Section 1, Public Law 690, August 8, 1946
Patent expires June 19, 1966

8 Claims. (Cl. 18—47.5)

The present invention comprises improvements in or relating to the treatment of pitches or tars and the manufacture of moulded articles therefrom, and it is an object of the invention to provide a material which affords advantages when employed for the production of moulded articles as compared with materials hitherto proposed.

Moulded carbon articles are commonly produced by moulding and heating a mixture of a subdivided carbon "body" (such as coke) with pitch or tar, the proportions being of the order of 80% and 20% by weight respectively. Often the steps of grinding, mixing, moulding and heating are repeated. Under such circumstances the manufacture of a carbon product having a high degree of freedom from mineral impurities becomes a very difficult matter. Removal of these mineral impurities from the carbon "body" is a laborious and expensive process. At each successive step of grinding and mixing contamination becomes possible, and the pitch or tar normally contains mineral impurities to the extent of, say 1 to 2%, whilst pitch, which has been treated by solvent extraction, filtration or re-distillation for the purpose of purification appears to suffer a diminution of the molecular species which confer the agglutinating properties necessary for the pitch to fulfil its essential function and to act as a binder.

By the expression "mineral impurities" is to be understood those compounds which in the practical analysis of coal or coal tar appear after oxidation as "ash," together with impurities such as iron, silica, etc., which are introduced during the process, e. g. by corrosion of vessels, attrition, and the like.

With the use of a moulding composition or powder as provided by the present invention, in the manufacture of useful moulded carbon articles which are substantially free from mineral impurities, it is possible to dispense with a carbon "body" and to employ highly purified pitches and tars without significant loss of their agglutinating properties.

According to the present invention there is provided a process comprising the intimate mixture of pitch or tar at an elevated temperature with concentrated sulphuric acid (including oleum).

As an alternative to concentrated sulphuric acid, for example if it is desired to avoid or to minimize the presence of sulphur, concentrated selenic acid may be used. Selenic acid, though normally solid at room temperature, may easily be obtained by melting and cooling in a super-cooled, liquid form, or the acid may be melted before admixture and added hot.

Again, there may be used a mixture of concentrated sulphuric and selenic acids, or a mixture of concentrated sulphuric acid and selenium dioxide. Preferably this latter mixture is used in the presence of an oxidising agent.

An excess of acid over and above that quantity necessary to secure precipitation of the polymerised or condensed product impairs the agglutinating properties and should therefore be avoided.

The pitch or tar is preferably first dissolved or dispersed in an organic solvent (such as solvent naphtha or a hydrogenated aromatic hydrocarbon such for example as decahydronaphthalene) which is relatively free from attack by the concentrated acid.

To facilitate precipitation in granular form of the polymerized or condensed tar or pitch, there may advantageously be added to the solution or dispersion a finely divided powder composed substantially of carbon and of the requisite purity, such for example as carbon black.

During the polymerization or condensation of the pitch or tar, it is sometimes desirable to introduce an oxidising agent and we have found that concentrated hydrogen peroxide is a suitable agent. Such agents are desirable when the mixture contains substances which are capable of reducing sulphuric or selenic acid and thereby necessitate the employment of disproportionately large quantities of these acids, for example, when the pitch or tar has an unusually high hydrogen content. As a rough guide, the lower the softening temperature of the pitch or tar the higher is its hydrogen content.

Since selenium dioxide is in a lower state of oxidation than selenic acid, the addition of selenium dioxide will more frequently call for the use of an oxidising agent.

The invention is to be understood as including a polymerised or condensed pitch or tar so produced, that is to say the solid reaction product which, if desired, may be washed and dried after removal from the liquid.

According to the present invention also, there is provided a method of producing a moulded carbon article wherein a polymerized or condensed pitch or tar made as above described is sub-divided, shaped and heated.

For most purposes it will be necessary in the heating of the shaped article to avoid intumescence, and in such cases a swell inhibitor may be admixed with the polymerised or condensed pitch or tar. Intimate admixture is important. A very useful swell inhibitor is carbon black.

One object of the subdividing operation is to facilitate the supply of the requisite weight and/or volume of material to the mould. Another object is to provide greater homogeneity in the moulded article. A suitable particle size is minus 72 mesh B. S. sieve or finer, preferably about minus 200 mesh B. S. sieve.

Shaping may be performed by any of the known pressure moulding processes, either at room temperature or at an elevated temperature. The pressure employed must be at least sufficient to enable the shaped article to be transferred undamaged to the oven or furnace, e. g. 1 ton per sq. inch for extrusion and 3 tons per sq. inch for intermittent moulding.

The heating of the shaped article must take place under non-oxidising conditions, that is to say, there must be no burning of the surface of the article. The minimum temperature to which the article should be heated is 550° C. In general, a maximum temperature of 850° C. will be sufficient but higher temperatures may of course, be employed. In order to avoid intumescence of the article, the rate of heating must be carefully controlled and normally will be between about 1° C. and 5° C. per minute.

Specific examples of the invention will now be described in order that the latter may be more fully understood.

*Example I*

25 gm. of carbon black were added to 300 gm. of a solution containing about one part in three by weight of coke-oven pitch in light solvent naphtha after removal of matter insoluble in the naphtha by filtration. This filtration removed the greater proportion of the mineral matter originally present in the pitch. The carbon black was kept uniformly in suspension by vigorous mechanical stirring and the dispersion was heated to over 140° C. when 9 gm. of 98% sulphuric acid were added slowly and the temperature maintained between 140 and 150° C. The solution boiled, sulphurous vapours were evolved, and a granular precipitate was obtained. This precipitate was drained off, crushed with a pestle and mortar, washed thoroughly with cold water and then dried for 1 hour in an oven at 200° C. The residue was crushed and ground in a ball mill till 95% passed through a 200 mesh B. S. sieve. 10 gm. of the powder was pressed into a small bar (2½"×½"×½") at 4 tons per square inch pressure and heated in an electrical furnace at 30° C. per minute in an inert atmosphere to a maximum temperature of 850° C. A strong, undistorted product was obtained on cooling, having an ash content or less than 0.1%.

*Example II*

100 gm. of a pitch from a petroleum cracking process (Ring and Ball softening point 165° C.) were dispersed in 200 gm. of hot light solvent naphtha. 7 ml. of a 5% solution of selenium dioxide in 96% sulphuric acid were added to the pitch dispersion, whose temperature was kept at 100–110° C. 10 ml. of 100% hydrogen peroxide was slowly and carefully added to the above mixture and a vigorous reaction occurred with the evolution of heat. When all the hydrogen peroxide had been added a granular precipitate was obtained. This was filtered off, washed with cold water, drained and dried for an hour at 160° C. The resultant residue was ground to a fine powder, moulded under pressure to the desired shape and thereafter fired at 1° C. per minute to 800° C.

*Example III*

100 gm. of the pitch used in Example II were dispersed in 200 gm. of hot light solvent naphtha and to the dispersion at 140–150° C. 20 gm. of 97% selenic acid were slowly added. A vigorous reaction took place and a granular precipitate was obtained. This was filtered off, washed with cold water, and dried, then ground to a fine powder, moulded to the desired shape under pressure and thereafter fired at 1° C. per minute to 800° C.

We claim:

1. A process for producing moulded products from pitch which comprises the steps of preparing a solution of pitch comprising one part of pitch in three parts of naphtha by weight, admixing therewith 2½ parts of carbon black to 30 parts by weight of said solution, polymerizing the solubilized pitch by agitating the admixture and adding thereto at a temperature above 100° C. one part by weight of concentrated sulphuric acid, recovering the polymerized pitch precipitated by the last named addition, washing and drying the precipitate so recovered, moulding the washed and dried precipitate to the required shape, and subjecting the moulded shape to heat treatment.

2. A process for producing moulded products from pitch which comprises the steps of preparing a solution of pitch comprising one part of pitch in three parts of naphtha by weight, polymerizing the solubilized pitch by adding thereto at a temperature above 100° C. one part by weight of concentrated sulphuric acid, recovering the polymerized pitch precipitated by the last named addition, washing and drying the precipitate so recovered, moulding the washed and dried precipitate to the required shape, and subjecting the moulded shape to heat treatment.

3. A process for producing moulded carbon products from pitch, which process comprises the steps of dissolving the pitch in solvent naphtha, intimately admixing therewith at a temperature exceeding 100° C. a concentrated mineral acid selected from the group consisting of concentrated sulphuric and concentrated selenic acid, to polymerize the pitch to form a granular precipitate, draining the precipitated granules of polymerized pitch from the liquor, washing and drying the precipitate so recovered, grinding the precipitate to a fine powder, moulding said powder to the required shape and subjecting the moulded shape under non-oxidizing conditions to a heat treatment at a gradually-increasing temperature which attains at least 550° C.

4. A process for producing moulded carbon products from pitch, which process comprises the steps of dissolving the pitch in solvent naphtha, intimately admixing therewith at a temperature exceeding 100° C. a concentrated mineral acid selected from the group consisting of concentrated sulphuric and concentrated selenic acid, adding selenium dioxide thereto to polymerize the pitch to form a granular precipitate, draining the precipitated granules of polymerized pitch from the liquor, washing and drying the precipitate so recovered, grinding the precipitate to a fine powder, moulding said powder to the required shape and subjecting the moulded shape under non-oxidizing conditions to a heat treatment at a gradually-increasing temperature which attains at least 550° C.

5. A process for producing moulded carbon products from pitch, which process comprises the steps of dissolving the pitch in solvent naphtha, intimately admixing therewith at a temperature exceeding 100° C. a concentrated mineral acid selected from the group consisting of concentrated sulphuric and concentrated selenic acid, adding hydrogen peroxide thereto to polymerize the pitch to form a granular precipitate, draining the precipitated granules of polymerized pitch from the liquor, washing and drying the precipitate so recovered, grinding the precipitate to a fine powder, moulding said powder to the required shape and subjecting the moulded shape under non-oxidizing conditions to a heat treatment at a gradually-increasing temperature which attains at least 550° C.

6. A process for producing moulded carbon products from pitch, which process comprises the steps of dissolving the pitch in solvent naphtha, intimately admixing therewith at a temperature exceeding 100° C. a concentrated mineral acid selected from the group consisting of concentrated sulphuric and concentrated selenic acid, adding selenium dioxide thereto, adding hydrogen peroxide thereto to polymerize the pitch to form a granular precipitate, draining the precipitated granules of polymerized pitch from the liquor, washing and drying the precipitate so recovered, grinding the precipitate to a fine powder, moulding said powder to the required shape and subjecting the moulded shape under non-oxidizing conditions to a heat treatment at a gradually-increasing temperature which attains at least 550° C.

7. A process for producing moulded carbon products from pitch, which process comprises the steps of dissolving the pitch in solvent naphtha, adding thereto finely-divided carbon black, agitating the mixture thus formed homogeneously to disperse the carbon black therein, intimately admixing therewith at a temperature exceeding 100° C. a concentrated mineral acid selected from the group consisting of concentrated sulphuric and concentrated selenic acid, adding selenium dioxide thereto, adding hydrogen peroxide thereto to polymerize the pitch to form a granular precipitate, draining the precipitated granules of polymerized pitch from the liquor, washing and drying the precipitate so recovered, grinding the precipitate to a fine powder, moulding said powder to the required shape and subjecting the moulded shape under non-oxidizing conditions to a heat treatment at a gradually-increasing temperature which attains at least 550° C.

8. A process for producing moulded carbon products from pitch, which process comprises the steps of preparing a solution of pitch comprising 1 part of pitch in 3 parts of solvent naptha by weight, admixing therewith 2½ parts of carbon black to 30 parts by weight of said solution, agitating the admixture and adding thereto at a temperature between 140° C. and 150° C. 1 part by weight of concentrated sulphuric acid to polymerize the pitch to form a granular precipitate, draining the precipitated granules of polymerized pitch from the liquor, washing and drying the precipitate so recovered, grinding the precipitate to a fine powder, moulding said powder under pressure to the required shape and subjecting the moulded shape under non-oxidizing conditions to a heat treatment of a gradually-increasing temperature which attains at least 550° C.

CHARLES DESMOND GREAVES
DEREK BRYCE SMITH.

REFERENCES CITED

The following references are of record in the file of this patent:

UNITED STATES PATENTS

| Number | Name | Date |
|---|---|---|
| 1,192,062 | Hinckley | July 25, 1916 |
| 1,288,723 | Snelling | Dec. 24, 1918 |
| 1,868,211 | Nobel | July 19, 1932 |
| 2,002,004 | Gard | May 21, 1935 |
| 2,177,856 | Bennett | Oct. 31, 1939 |
| 2,281,728 | Thelen | May 5, 1942 |
| 2,299,469 | D'Antal | Oct. 20, 1942 |